United States Patent [19]

Kando et al.

[11] Patent Number: 5,607,700

[45] Date of Patent: Mar. 4, 1997

[54] SYNTHETIC RESIN PELLETIZING MACHINE

[75] Inventors: Akiyoshi Kando; Hiroshi Yoshida; Kazuki Kuse, all of Toyama-ken, Japan

[73] Assignee: YKK Corporation, Tokyo, Japan

[21] Appl. No.: 228,263

[22] Filed: Apr. 15, 1994

[30] Foreign Application Priority Data

Apr. 15, 1993 [JP] Japan .................... 5-088754

[51] Int. Cl.$^6$ .................... B29C 47/10; B29C 47/38; B29C 47/78
[52] U.S. Cl. .................... 425/71; 425/72.1; 264/38; 264/180; 264/176.1; 264/178 F; 264/178 R
[58] Field of Search ................. 425/71, 72.1; 264/176.1, 264/178 F, 178 R, 38, 180

[56] References Cited

U.S. PATENT DOCUMENTS

| | | | |
|---|---|---|---|
| 1,740,029 | 12/1929 | Moomy .................... | 425/71 |
| 2,081,171 | 5/1937 | Dreyfus .................... | 425/71 |
| 2,834,053 | 5/1958 | Bilanin et al. .................... | 264/141 |
| 3,239,881 | 3/1966 | Larsen .................... | 264/176.1 |
| 3,450,811 | 6/1969 | Takizawa et al. .................... | 425/71 |
| 3,470,288 | 9/1969 | Dunnington et al. .................... | 425/71 |
| 3,582,453 | 6/1971 | Sloan et al. .................... | 425/71 |
| 3,724,977 | 4/1973 | Lang .................... | 425/72.1 |
| 3,733,153 | 5/1973 | Moziek .................... | 425/71 |
| 3,737,506 | 6/1973 | Martin et al. .................... | 264/176.1 |
| 3,804,567 | 4/1974 | Recknagel .................... | 425/71 |
| 3,988,085 | 10/1976 | Krchma .................... | 425/71 |
| 4,063,860 | 12/1977 | Cushing .................... | 264/176.1 |
| 4,180,539 | 12/1979 | Clarke .................... | 264/143 |
| 4,528,157 | 7/1985 | Lettner et al. .................... | 425/71 |
| 4,632,752 | 12/1986 | Hunke .................... | 425/71 |
| 4,863,653 | 9/1989 | Takubo et al. .................... | 425/71 |
| 5,182,115 | 1/1993 | Nogossek et al. .................... | 425/71 |
| 5,441,394 | 8/1995 | Keilert et al. .................... | 425/71 |

FOREIGN PATENT DOCUMENTS

| | | | |
|---|---|---|---|
| 516127 | 5/1992 | European Pat. Off. .................... | 425/71 |
| 209999 | 5/1984 | German Dem. Rep. . | |
| 38-20977 | 10/1963 | Japan .................... | 425/71 |
| 49-30695 | 8/1974 | Japan .................... | 425/71 |

OTHER PUBLICATIONS

Abstract of Japanese Published Application 63–7912 of Jan. 13, 1988, *Patent Abstracts of Japan*, vol. 12, No. 201 (M707) [3048] Jun. 10, 1988.
Abstract of Japanese Published Application 56–5713 of Jan. 21, 1981, *Patent Abstracts of Japan*, vol. 5, No. 50 (M–62) [722] Apr. 9, 1981.
Abstract of Japanese Published Application 57–178809 of Nov. 4, 1982, *Patent Abstracts of Japan*, vol. 7, No. 24 (M–189) [1169] Jan. 29, 1983.
Abstract of Japanese Published Application 61–68204 of Apr. 8, 1986, *Patent Abstracts of Japan*, vol. 10, No. 234 (M–507) [2290] Aug. 14, 1986.
Abstract of Japanese Published Application 61–123504 of Jun. 11, 1986, *Patent Abstracts of Japan*, vol. 10, No. 311 (M–528) [2367] Oct. 23, 1986.
Abstract of Japanese Published Application 61–148006 of Jul. 5, 1986, *Patent Abstracts of Japan*, vol. 10, No. 349 (M–538) [2405] Nov. 26, 1986.

*Primary Examiner*—Jan H. Silbaugh
*Assistant Examiner*—Vi Duong Dang
*Attorney, Agent, or Firm*—Hill, Steadman & Simpson

[57] ABSTRACT

A synthetic resin pelletizing machine includes an extrusion cylinder forming, with a horizontal plane, an installation angle θ which is in the range of 0°<θ<90°, a raw material feed passage extending upwardly from said extrusion cylinder at a predetermined angle relative to a longitudinal axis of said extrusion cylinder, and a cooling unit disposed below a die head and having a double bath construction composed of a first cooling bath and a second cooling bath disposed in the first cooling bath. The pelletizing machine thus constructed is compact in size and is capable of assuring a smooth feed of a raw material to the extrusion cylinder as well as a smooth passage of an extruded strand through the cooling unit.

10 Claims, 3 Drawing Sheets

SYNTHETIC RESIN PELLETIZING MACHINE

BACKGROUND OF THE INVENTION

1. Field of the Invention

The present invention relates to a synthetic resin pelletizing machine or pelletizer that shapes by extruding a raw material, such as synthetic resin powder, granules or pellets, into a continuous form of extrudate and, after cooling the continuous extrudate, cuts off the same into small pellets.

2. Description of the Prior Art

In the synthetic resin molding industry, it is a customary practice to mix a plurality of synthetic resin materials of different properties to form a molded product of desired characteristics. In this instance, if the mixing is not homogeneous, the final product has undesired characteristics. To avoid this problem, as disclosed in Japanese Patent Publication No. 63-32604, each of various synthetic resins are separately supplied to an extrusion unit in which each resin is separately melted and separately extracted as a strand into a cooling water bath. The cooled strand is cut into fine granules or pellets. The fine pellets thus produced are then mixed with similar pellets of different kinds of synthetic resins to form a molded article.

In general, the conventional pelletizing machine of the type concerned is, as also mentioned in the above-referenced Japanese patent publication, a large-sized machine to cope with the mass-production system. Accordingly, the extrusion unit incorporated in such a large-sized pelletizing machine is necessarily large in size, and taking the maintenance into account, it is composed of a horizontal-type extrusion unit having an extrusion cylinder horizontally mounted on a machine frame.

The known pelletizing machine of the foregoing construction occupies a large space in a horizontal direction and, hence, uses the space inefficiently. In addition, the known pelletizing machine is not adaptable to the multi-product, small-quantity production system which has recently been required for various molded articles. An attempted use of the conventional pelletizing machine in the multi-product, small-quantity production system would produce an excessive stock of molded articles, requiring a complicated stock control operation. Accordingly, there is a keen demand for a pelletizing machine which is compact in size and readily adaptable to the multi-product, small-quantity production system. Furthermore, since the raw resin is supplied to the horizontal-type extrusion cylinder at right angles to the axis of an extrusion screw, the raw resin is likely to become clogged at an inlet of the extrusion cylinder. In addition, the strand, as it is extruded from the horizontal-type extrusion cylinder into a cooling bath, is subjected to a lateral bending force which will exert negative influence on the quality of the pellets produced from the extruded strand.

SUMMARY OF THE INVENTION

It is, therefore, an object of the present invention to provide a synthetic resin pelletizing machine which is compact in size, readily adaptable to the multi-product, small-quantity production system, and capable of assuring a smooth feed of raw resin to an extrusion unit as well as a smooth passage of an extruded strand through a cooling bath.

According to the present invention, there is provided a synthetic resin pelletizing machine of the type having a molding portion in which a raw material including a synthetic resin, a pigment and various additives is melted and kneaded and then shaped by extrusion into a strand, and the extruded strand is cooled, characterized in that an extrusion cylinder having at its lower end a die head forms, with a horizontal plane, an installation angle $\theta$ which is in the range of $0° < \theta < 90°$, a raw material feed passage extends upwardly from said extrusion cylinder at a predetermined angle relative to a longitudinal axis of the extrusion cylinder, and a cooling unit is disposed below the die head for cooling the strand, the cooling unit having a double bath construction composed of a first cooling bath and a second cooling bath disposed in the first cooling bath.

The extrusion cylinder is generally arranged vertically and not horizontally, so that the pelletizing machine as a whole is compact in size and occupies a relatively small space in the horizontal direction. Since the raw material is supplied obliquely from the raw material feed passage into the extrusion unit and enters toward the extrusion direction, the extrusion cylinder is free from a clogging problem which would otherwise occurs at an inlet of the extrusion cylinder.

The pelletizing machine ordinarily includes a cutting unit, which is disposed at a downstream end of a strand feed path in the cooling unit, for cutting the strand into pellets of a predetermined size.

The installation angle $\theta$ of the extrusion cylinder relative to the horizontal plane is preferably in the range of $45° < \theta < 90°$. In connection with the installation angle $\theta$, the angle between the synthetic resin-chip feed passage and the longitudinal axis of the extrusion cylinder is set in the range of 0° to 45°.

In addition, the first and second cooling baths contain cooling water, and the cooling water is circulated through the first and second cooling baths by means of a pump. With this circulation, the cooling water can be used efficiently. The strand extruded from the extrusion cylinder toward the cooling unit is not subjected to a lateral bending force and can enter into the cooling unit by its own weight. Accordingly, pellets cut off from the strand are extremely uniform in quality.

The above and other objects, features and advantages of the present invention will become manifest to those versed in the art upon making reference to the detailed description and the accompanying sheets of drawings in which preferred structural embodiments incorporating the principles of the present invention are shown by way of illustrative example.

DETAILED DESCRIPTION

Figure 1:
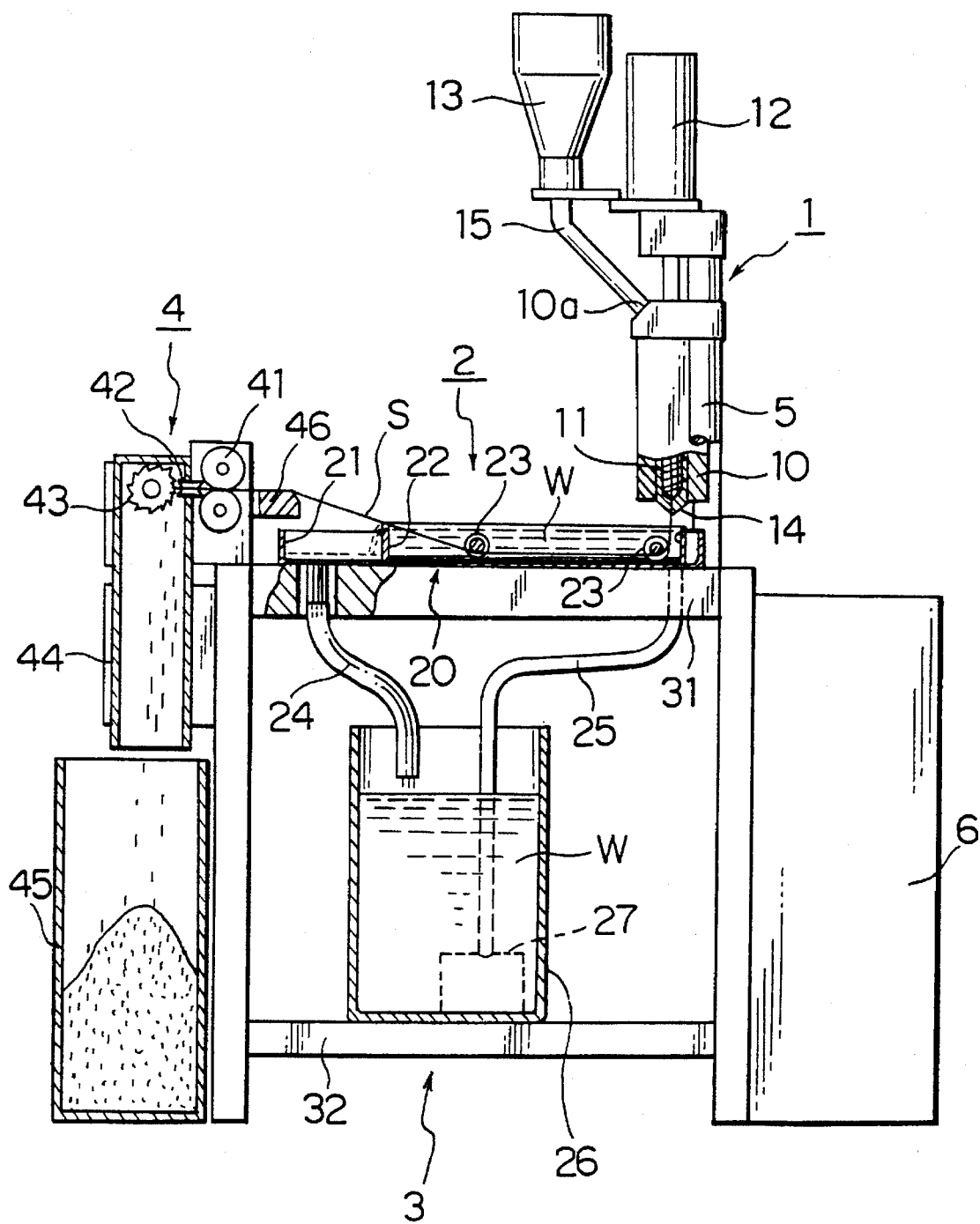
FIG. 1 is a front elevational view showing the general construction of a synthetic resin fine pelletizing machine according to a first embodiment of the present invention, with main parts shown in cross section.
Figure 2:
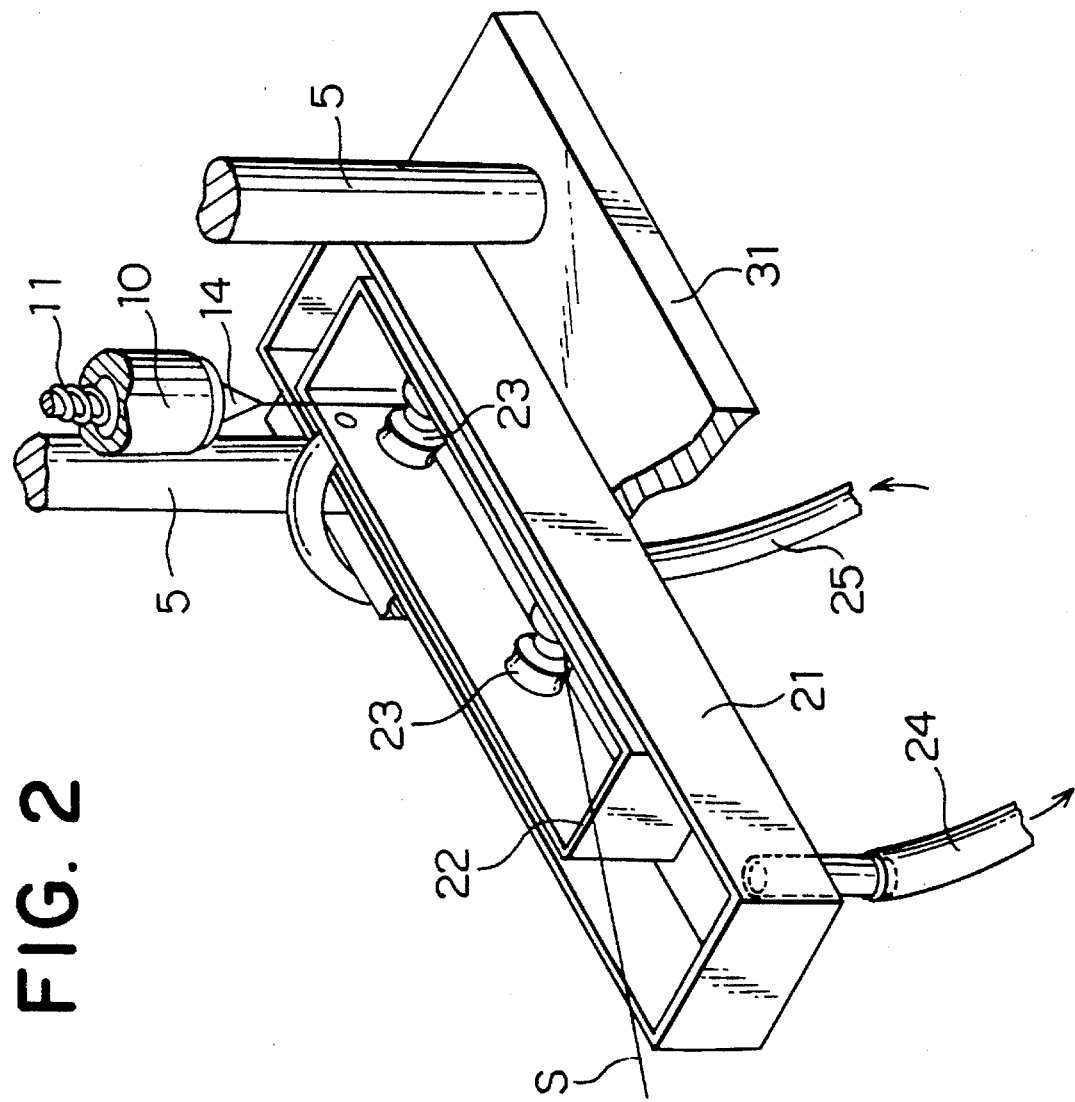
FIG. 2 is a perspective view showing on enlarged scale a cooling unit of the pelletizing machine.

Referring now to FIGS. 1 and 2, there is shown a synthetic resin pelletizing machine according to a first embodiment of the present invention. The pelletizing machine is so constructed as to reduce the overall machine size. To this end, these parts of the pelletizing machine which must be arranged horizontally are minimized to increase those parts having a vertical construction. A typical example of the vertically arranged parts is an extrusion unit 1. As shown in FIG. 1, the extrusion 1 of the pelletizing machine comprises an extrusion cylinder 10, an extrusion screw 11, a driving member 12 for the extrusion screw 11, and a raw material loading hopper 13. These parts 10–13 of the extrusion unit 1 are structurally and functionally similar to those of the conventional extrusion unit. The extrusion unit 1 of this embodiment differs from the conventional one in that the extrusion unit 1 as a whole is disposed vertically. As a result, the driving member 12 is disposed directly above the extrusion cylinder 10, a die head 14 is attached to a lower end of the extrusion cylinder 10, and the raw material loading hopper 13 is disposed parallel to the extrusion cylinder 10 via a raw material feed pipe 15 which extends obliquely and upwardly from a raw material inlet 10a of the extrusion cylinder 10. The feed pipe 15 defines therein a raw material feed passage. In the illustrated embodiment, the extrusion unit 1 is upright. However, it is possible to dispose the extrusion unit 1 obliquely at an angle θ to a horizontal plane, the angle θ being in the range of 0° to 90°. Taking the efficient use of the space and the function of the extrusion unit 1 into account, the angle θ is preferably in the range of 45° to 90°.

The pelletizing machine further includes a cooling unit 2 disposed directly below the die head 14. The cooling unit 2, as clearly shown in FIGS. 1 and 2, is composed of a double cooling bath 20 which includes a rectangular first cooling bath 21 and a rectangular second cooling bath 22 received in the first cooling bath 21. A pair of freely rotatable, grooved guide rollers 23, 23 are disposed in the second cooling bath 22. The guide rollers 23 are located respectively adjacent to the front and rear ends (left and right ends in FIG. 1) of the second cooling bath 22 so as to define a main portion of a strand feed path along which a strand S is advanced. A water discharge pipe 24 is connected via a discharge hole (not designated) to the bottom wall of a front end portion (left end portion in FIG. 1) of the first cooling bath 21. Similarly, a water supply pipe 25 is connected via a supply hole (shown in FIG. 2 not designated) to a side wall of a rear end portion (right end portion in FIG. 1) of the second cooling bath 22. The water supply pipe 25 has a receiving end connected to a feed-water pump 27 (FIG. 1). The water discharge pipe 24 has a discharge end which is disposed in a water storage tank 26 which receives the feed-water pump 27. The water storage tank 26 is disposed below the double cooling bath 20 and mounted on a machine frame 3.

The machine frame 3 is composed of a table having a top support plate 31 and an intermediate support plate 32. The extrusion unit 1 and the double cooling bath 20 are mounted on the top support plate 31, and the water storage tank 26 is mounted on the intermediate support plate 32.

According to the first embodiment, a cutting unit 4 is disposed along a front end wall (left end wall in FIG. 1) of the machine frame 3 such that the cutting unit 4 is located substantially at a downstream end of the strand feed path extending through the cooling unit 2. To facilitate the reduction of the overall size of the pelletizing machine, a longitudinal extent of the cutting unit 4 which projects from the front end of the machine frame 3 is reduced as much as possible so that the cutting unit 4 has a horizontally contracted, vertically elongated construction. As shown in FIG. 1, a cooperating pair of feed rollers 41 is mounted on the front end portion of the top support plate 31. A fixed cutter 42 is disposed adjacent to a strand discharge side of the feed roller pair 41, and a rotary cutter 43 is disposed in confrontation with the fixed cutter 42. The fixed cutter 42 and the rotary cutter 43 are located in a vertically extending, rectangular tube-like discharge chute 44. The chute 44 has a top lid or cover. A pellet collecting case 45 is disposed below the discharge chute 44 for receiving therein granules or pellets produced by cutting the strand S. A strand guide member 46 formed of an elastic material, such as a foamed plastics plate, is disposed immediately upstream of the feed roller pair 41 for guiding the strand S. The strand guide member 46 also has a function to remove water which has adhered to the strand S while the strand S is cooled. In FIG. 1, numeral 5 denotes tie rods and 6 a control panel.

It is obvious that the structure of the cutting unit 4 is not restricted to the illustrated embodiment. Furthermore, the cutting unit 4 may not be continuous with the front end wall of the machine frame 3. As an alternative, the cutting unit 4 in the foregoing embodiment may be replaced by a strand case or container for receiving therein the extruded strand S, in which instance a cutting unit is provided separately from the machine frame 3.

The synthetic resin pelletizing machine of the foregoing construction operates as follows. The raw material loading hopper 13 is charged with a raw material composed of a synthetic resin and various additives, such as a pigment having a predetermined color and a plastiziging agent, mixed in predetermined ratios with the synthetic resin. The raw material loaded in the raw material loading hopper 13 passes through the raw material feed pipe 15 and then is supplied obliquely from the raw material inlet 10a into the extrusion cylinder 10 at a predetermined angle to the axis of the extrusion screw 11 and toward the extrusion direction.

It is to be noted that in the case of the conventional extrusion unit, the raw material is supplied into the extrusion cylinder at right angles to the axis of the extrusion cylinder, whereas in the case of the present invention, the raw material is supplied obliquely into the extrusion cylinder 10 at a predetermined angle to the longitudinal axis of the extrusion cylinder 10 and toward the extrusion direction of the extrusion screw 11. Accordingly, in the pelletizing machine of the invention, the raw material is smoothly forced in the extrusion direction by the extrusion screw 11 without clogging at the raw material inlet 10a of the extrusion cylinder 10. The raw material is melted and kneaded homogeneously while being advanced in the extrusion cylinder 10, so that fine granules or pellets formed as a final product are extremely uniform in quality.

The inside temperature of the extrusion cylinder 10 is properly controlled, so that the raw material supplied in the extrusion cylinder 10 is plasticated and kneaded as it is progressively advanced toward the die head 14 by the rotation of the extrusion screw 11. From the die head 14 which is attached to the lower end of the extrusion cylinder 10, the raw material is extruded downwardly into the second cooling bath 22 in the form of the strand S having a predetermined thickness. In this instance, since the extrusion direction of the strand S is equal to the direction of its own weight acting on the strand S, the extruded strand S, as opposed to the strand formed by the conventional horizontal-type extrusion unit, is not subjected to a lateral bending force and can enter by its own weight into the second cooling bath 22.

The strand S passes through cooling water W in the second cooling bath 22 while it is being guided by the grooved guide rollers 23. The strand S is thus cooled with water W. Then, the cooled strand S passes through the strand guide member 46 during which time water adhering to the surface of the strand S is removed. Subsequently, the strand S is continuously advanced by the feed roller pair 41 toward the fixed cutter 42 and the rotary cutter 43. Between the fixed cutter 42 and the rotary cutter 43, the strand S is cut into granules or pellets of a predetermined size. The pellets thus produced fall within the discharge chute 44 and then are received in the collecting case 45 disposed below the discharge chute 44.

In the cooling unit 2, the feed-water pump 27 disposed in the water storage tank 26 feeds cooling water W from the storage tank 26 through the water supply pipe 25 to the second cooling bath 22. The cooling water W then overflows from the second cooling bath 22 into the first cooling bath 21 from which the cooling water W is discharged via the water discharge pipe 24 into the water storage tank 26 where the cooling water W is stored. With this circulation, the cooling water W is used efficiently.

Figure 3:
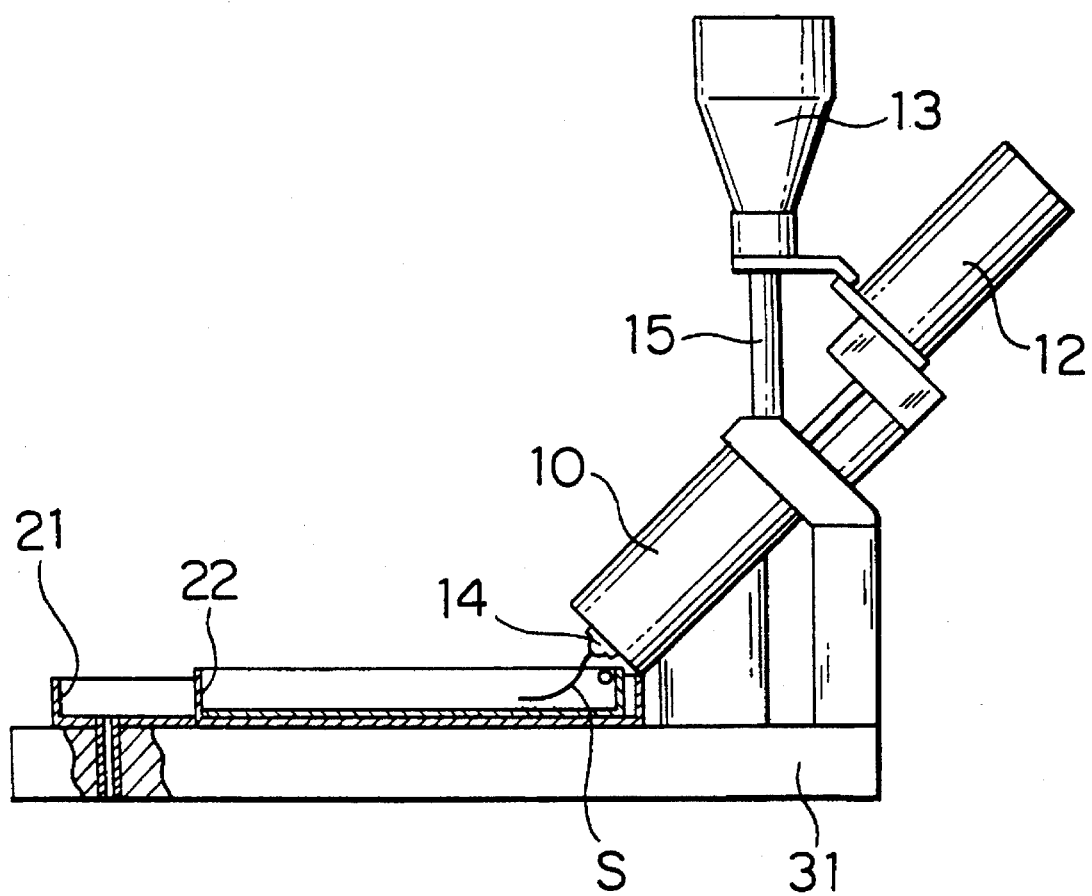
FIG. 3 is a front elevational view showing the general construction of a synthetic resin fine pelletizing machine according to a second embodiment of the present invention, with main parts shown in cross section.

FIG. 3 illustrates a second embodiment of the present invention. In this embodiment, the extrusion cylinder 10 is disposed obliquely at an angle of about 45°, and the raw material loading hopper 13 and the raw material supply pipe 15 are disposed vertically. Also in this embodiment, the raw material supply pipe 15 is connected with the extrusion cylinder 10 in a crossing manner at an angle of about 45°. Similarly, the die head 14 faces obliquely at the same angle (viz., 45°) to the cooling unit 2, so that the extruded strand S enters obliquely into the second cooling bath 22. In this instance, the strand S is subjected to a force tending to bend the strand S. However, the bending force is considerably smaller than that produced in the case of the conventional horizontal-type extrusion unit and can only exert negligible influence on the quality of the strand S. Other structural and functional details of the second embodiment are substantially the same as those of the first embodiment previously mentioned.

The present invention thus constructed makes it possible to reduce the overall size of the pelletizing machine and hence use the space efficiently on condition that the pelletizing machine has the same production capacity as the conventional pelletizing machine. In particular, the extrusion unit 1 is of the vertical type so that when the overall size of the pelletizing machine is reduced to cope with the multi-product, small-quantity production system, various maintenance works can be achieved easily.

As is apparent from the foregoing description, the synthetic resin pelletizing machine of the present invention is compact as a whole and, hence, is able to use the space efficiently. In addition, the pelletizing machine can respond to the need for downsizing, is able to obviate the need for troublesome maintenance even though a vertical-type extrusion unit is used, and is adaptable to the multi-product, small-quantity production system. The vertical-type extrusion unit provides a smooth extrusion mechanism for a melted resin. More specifically, since the raw material is supplied obliquely into the extrusion cylinder and toward the extrusion direction, the raw material is smoothly advanced by the extrusion screw without clogging at the inlet of the extrusion cylinder. The raw material while being advanced in the extrusion cylinder is plasticated and kneaded homogeneously. The strand extruded from the die head reaches the cooling unit by its own weight, so that an extruded, incompletely solidified strand is not subjected to undue bending forces. Thus, pellets produced from the strand has high dimensional accuracy.

Obviously, various minor changes and modifications of the present invention are possible in the light of the above teaching. It is therefore to be understood that within the scope of the appended claims the invention may be practiced otherwise than as specifically described.

What is claimed is:

1. In a synthetic resin pelletizing machine having a molding portion in which a raw material including a synthetic resin, a pigment and various additives is melted and kneaded and then shaped by extrusion into a strand, and means for cooling the extruded strand, the improvements comprising:

an extrusion cylinder containing an extrusion screw and having a die head at a lower end, said cylinder, screw and die head being on a longitudinal axis and being mounted relative to a horizontal plane, with the longitudinal axis of the cylinder, screw and die head forming an installation angle $\theta$ which is in the range of $0°<\theta<90°$ to the horizontal plane;

a raw material feed passage extending upwardly from said extrusion cylinder with an axis of the passage at an angle in a range of 0° to 45° relative to the longitudinal axis of said extrusion cylinder, said passage transferring a flow of material therethrough to said cylinder; and said means for cooling being disposed below said die head for cooling the strand, said means for cooling having a double bath construction composed of a first cooling bath of water and a second cooling bath of water being disposed in said first cooling bath, the second cooling bath of water having a container with a base and four side walls and discharging water from the second cooling bath over edges of the side walls into the first cooling bath, said second cooling bath receiving the strand directly from the die head and having rollers for guiding the strand passing therein, and means including a pump for circulating water discharged from the first cooling bath back to the second cooling bath.

2. In a synthetic resin pelletizing machine according to claim 1, wherein the installation angle $\theta$ is in a range of $45°<\theta<90°$.

3. In a synthetic resin pelletizing machine according to claim 1, which includes means for cutting the strand into pellets being disposed to receive the strand leaving the means for cooling.

4. In a synthetic resin pelletizing machine according to claim 3, wherein the installation angle $\theta$ is in a range of $45°<\theta<90°$.

5. In a synthetic resin pelletizing machine according to claim 4, wherein the double bath construction is in the horizontal plane.

6. In a synthetic resin pelletizing machine according to claim 3, wherein the double bath construction lies in said horizontal plane.

7. In a synthetic resin pelletizing machine according to claim 2, wherein the double bath construction lies in said horizontal plane.

8. In a synthetic resin pelletizing machine according to claim 1, wherein the double bath construction lies in said horizontal plane.

9. A synthetic resin pelletizing machine comprising a molding portion including a container for raw material including synthetic resin, a pigment and various additives, first means for melting the raw material, kneading the raw material and then extruding the melted, kneaded material into a continuous strand of molten material; second means for cooling the extruded strand, and means for cutting the cooled strand into pellets; the first means comprising an extrusion cylinder containing an extrusion screw and terminating at one end in a die head, said cylinder, screw and die head being on a longitudinal axis and being mounted relative to a horizontal plane over the second means with the die head directed at the second means and the longitudinal axis of the cylinder, screw and die head forming an installation angle θ which is in a range of 45°<θ<90° to the horizontal plane, a raw material feed passage extending upward from said extrusion cylinder with an axis of the passage at an angle in a range of 0° to 45° relative to the longitudinal axis and extending to the container for conducting said material from said container into the extrusion cylinder; said second means having a double bath construction composed of a first cooling bath of water for receiving the second cooling bath of water, said second cooling bath having a container having a bottom and four side walls with upper edges, said second cooling bath receiving the strand directly from the die head and discharging water from the second cooling bath over said upper edges into the first cooling bath, said second cooling bath having rollers for guiding the strand passing therein and means including a pump for circulating discharge from the first cooling bath back to the second cooling bath, said means for cutting being disposed to receive the strand leaving the second means so that the molten strand is continuously extruded from the die head and reaches the cooling bath due to gravitational forces without undue bending forces being applied thereto.

10. A synthetic resin pelletizing machine according to claim 9, wherein the double bath construction lies in said horizontal plane.

* * * * *